(12) United States Patent
Schmidt et al.

(10) Patent No.: US 7,562,822 B1
(45) Date of Patent: Jul. 21, 2009

(54) METHODS AND DEVICES FOR CREATING AND PROCESSING CONTENT

(75) Inventors: Christopher Schmidt, Fairfax, CA (US); Michael Handelman, Phoenix, AZ (US); Elizabeth Young, San Francisco, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 630 days.

(21) Appl. No.: 11/323,249

(22) Filed: Dec. 30, 2005

(51) Int. Cl.
*G06K 7/00* (2006.01)

(52) U.S. Cl. ................ 235/461; 235/454; 345/156; 345/626

(58) Field of Classification Search ................ 235/461, 235/454, 494, 460; 345/156, 626
See application file for complete search history.

(56) References Cited

U.S. PATENT DOCUMENTS

| | | | | |
|---|---|---|---|---|
| 4,703,511 A | * | 10/1987 | Conoval | ............ 382/182 |
| 6,502,756 B1 | | 1/2003 | Fahraeus | |
| 6,966,495 B2 | | 11/2005 | Lynggaard et al. | |
| 2006/0028488 A1 | * | 2/2006 | Gabay et al. | ............ 345/626 |
| 2008/0042970 A1 | * | 2/2008 | Liang et al. | ............ 345/156 |

FOREIGN PATENT DOCUMENTS

| | | |
|---|---|---|
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |

* cited by examiner

*Primary Examiner*—Edwyn Labaze

(57) ABSTRACT

A mark on a surface in sensed by a pen as the mark is made on the surface using the pen. The surface has printed thereon a pattern of markings that define a two-dimensional coordinate system. Stroke data associated with the mark is stored. The stroke data includes coordinates corresponding to a subset of the pattern of markings traversed by the mark. The stroke data is associated with a region of the surface. The stroke data is operated on according to an operation associated with the region.

22 Claims, 7 Drawing Sheets

METHODS AND DEVICES FOR CREATING AND PROCESSING CONTENT

BACKGROUND OF THE INVENTION

1. Field of the Invention

Embodiments in accordance with the present invention generally pertain to the retrieval and storage of information.

2. Related Art

Software applications generally known as "HyperText Markup Language (HTML) editors" are used to create Web pages. As an alternative to using an HTML editor, a Web page can be created by entering HTML codes directly into a text editor. However, the use of text editors can require a greater understanding of HTML and other Web technologies, while HTML editors offer more convenience and are easier to use.

Greater and greater numbers of people are creating their own Web sites, as a means of sharing news, pictures, and other information with friends and relatives who may be at a distance. Even more people may be open to creating a Web site if the process for doing so was more intuitive and perhaps even more convenient.

SUMMARY OF THE INVENTION

A method and/or system that can make the process of designing a Web page more intuitive and more convenient would be advantageous. Embodiments in accordance with the present invention provide these and other advantages.

Embodiments of the present invention pertain to methods and systems of storing information captured by, for example, a handheld pen-shaped computer system that has an optical sensor and a writing utensil (e.g., an "optical pen"). In one embodiment, a "mark" on a surface (e.g., on a piece of paper) is sensed by the optical pen as the mark is made on the surface by the writing utensil. A "mark" may take any shape and may include multiple characters. That is, a mark can be a single mark, a letter or a number, a string of letters and/or numbers, a drawing, a part of a drawing, a line or lines (straight or otherwise), symbols, etc., without limitation.

The surface has printed thereon a pattern of markings (e.g., a dot pattern) that defines spatial (e.g., two-dimensional) coordinates on the surface. An encoded version of the mark is stored in computer memory. For example, some subset of the pattern of markings traversed by the mark can be stored. Specifically, information identifying the spatial coordinates corresponding to the subset of the pattern of markings traversed by the mark is stored; this information is referred to herein as "stroke data." In one embodiment, the stroke data is associated with a region of the surface. The stroke data is operated on according to an operation that is associated with the region.

In one embodiment, the operation includes a process that is applied to the stroke data. For example, a character recognition process can be applied to the stroke data.

In another embodiment, the operation includes associating metadata with the stroke data. In yet another embodiment, metadata is associated with processed stroke data, thus essentially associating two levels of information with the stroke data. That is, for example, the stroke data may be processed using a character recognition process to identify a character or string of characters, and metadata may then be associated with the character or character string.

The metadata can be subsequently used when a representation of the mark is rendered on a display device. That is, a representation of the mark, when rendered on a display device, will have a property that is determined according to the metadata. In one embodiment, the stroke data and the metadata are used by a software application to create a Web page.

For example, the metadata may include information identifying a memory-resident file, so that the mark when rendered serves as a hyperlink to that file. The metadata may instead include information identifying a Web site, so that the mark when rendered serves as a hyperlink to that Web site. The metadata may instead include information identifying a format (e.g., a size and/or color) for rendering the mark.

In summary, according to embodiments of the present invention, a user can use a device such as an optical pen to design, for example, a Web page (e.g., a home page). Using the optical pen, the user draws the Web page on, for example, a piece of paper on which is printed a pattern of markings (e.g., a dot pattern) that defines spatial (e.g., two-dimensional) coordinates on the paper. In the process of drawing the page, the various portions of the drawing are operated on according to their respective locations on the piece of paper. Different types of operations can be associated with different parts of the drawing. The drawing information can be stored in the optical pen until the pen is connected to a personal computer or a Web server in order to create a Web site.

As a result, Web page design, for example, is made more convenient and more intuitive. These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sensing" or "storing" or "defining" or "associating" or "receiving" or "selecting" or "generating" or "creating" or "decoding" or "invoking" or "accessing" or "retrieving" or "identifying" or the like, refer to the actions and processes of a computer system (e.g., flowchart 1000 of FIG. 10), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
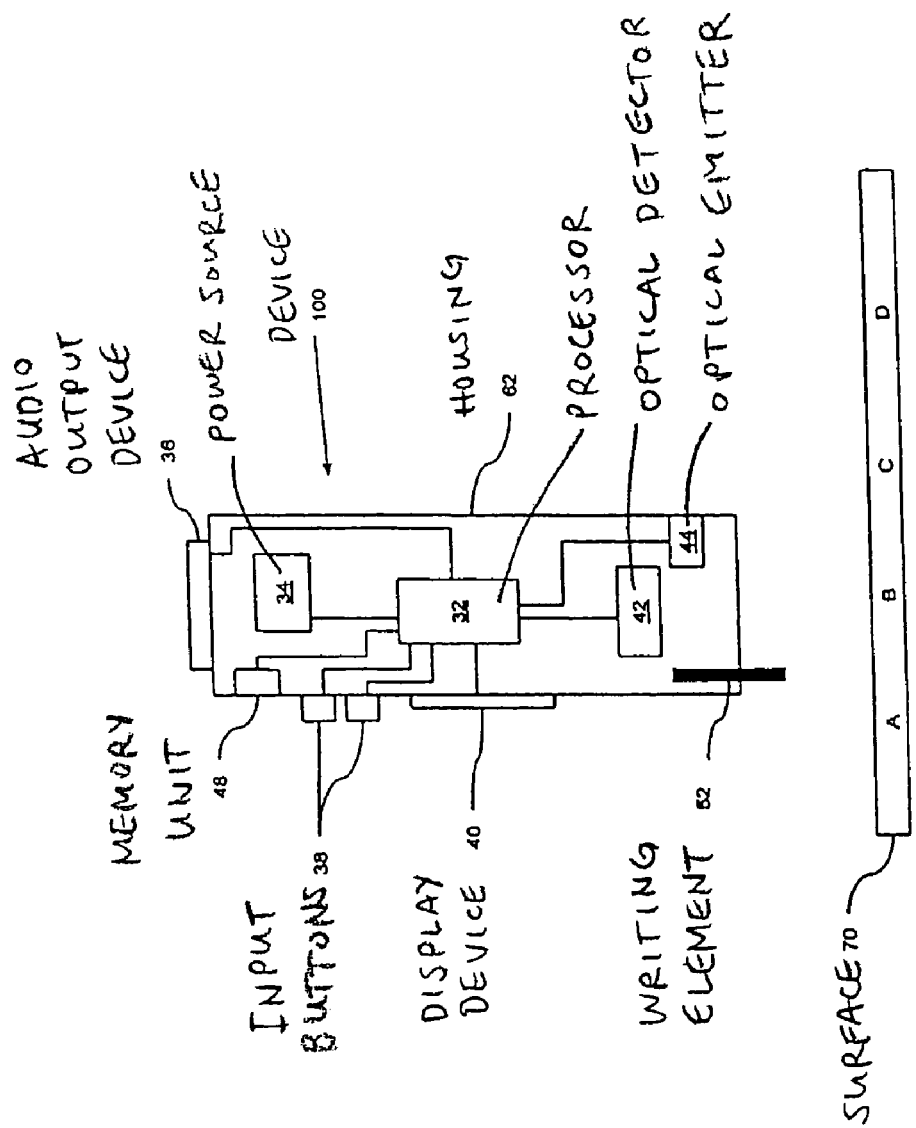
FIG. 1 is a block diagram of a device upon which embodiments of the present invention can be implemented.

FIG. 1 is a block diagram of a device 100 upon which embodiments of the present invention can be implemented. In general, device 100 may be referred to as a pen-shaped computer system or an optical device, or more specifically as an optical reader, optical pen or digital pen.

Devices such as optical readers or optical pens conventionally emit light that reflects off a surface to a detector or imager (e.g., as in a digital camera). As the device is moved relative to the surface (or vice versa), successive images are rapidly captured. By analyzing the images, movement of the optical device relative to the surface can be tracked.

According to embodiments of the present invention, device 100 is used with a sheet of "digital paper" on which a pattern of markings—specifically, very small dots—are printed. In one embodiment, the dots are printed on paper in a proprietary pattern with a nominal spacing of about 0.3 millimeters (0.01 inches). In one such embodiment, the pattern consists of 669, 845, 157, 115, 773, 458, 169 dots, and can encompass an area exceeding 4.6 million square kilometers, corresponding to about 73 trillion letter-size pages. This "pattern space" is subdivided into regions that are licensed to vendors (service providers)—each region is unique from the other regions. In essence, service providers license pages of the pattern that are exclusively theirs to use. Different parts of the pattern can be assigned different functions, and service providers develop software programs and applications that assign functionality to the various patterns of dots within their respective regions.

An optical pen such as device 100 essentially takes a snapshot of the surface of the digital paper, perhaps 100 times a second or more. By interpreting the positions of the dots captured in each snapshot, device 100 can precisely determine its position on the page in two dimensions. That is, in a Cartesian coordinate system, for example, device 100 can determine an x-coordinate and a y-coordinate corresponding to the position of the device relative to the page. The pattern of dots allows the dynamic position information coming from the digital camera in device 100 to be processed into signals that are indexed to instructions or commands that can be executed by a processor in the device.

In the embodiment of FIG. 1, device 100 includes a processor 32 inside a housing 62. In one embodiment, housing 62 has the form of a pen or other writing utensil. Processor 32 is operable for processing information and instructions used to implement the functions of device 100, which are described below.

In one embodiment, the device 100 includes an audio output device 36, a display device 40, or both an audio device and display device coupled to the processor 32. In other embodiments, the audio output device and/or the display device are physically separated from device 100, but in communication with device 100 through either a wired or wireless connection. For wireless communication, device 100 can include a transceiver or transmitter (not shown in FIG. 1). The audio output device 36 may include a speaker or an audio jack (e.g., for an earphone or headphone). The display device 40 may be a liquid crystal display (LCD) or some other suitable type of display.

In the embodiment of FIG. 1, device 100 includes input buttons 38 coupled to the processor 32 for activating and controlling the device 100. For example, the input buttons 38 allow a user to input information and commands to device 100 or to turn device 100 on or off. Device 100 also includes a power source 34 such as a battery.

Device 100 also includes a light source or optical emitter 44 and a light sensor or optical detector 42 coupled to the processor 32. The optical emitter 44 may be a light emitting diode (LED), for example, and the optical detector 42 may be a charge coupled device (CCD) or complementary metal-oxide semiconductor (CMOS) imager array, for example. The optical emitter 44 illuminates surface 70 or a portion thereof. Light reflected from the surface 70 is received at and recorded by optical detector 42.

In one embodiment, a pattern of markings is printed on surface 70. The surface 70 may be any suitable surface on which a pattern of markings can be printed, such as a sheet a paper or other types of surfaces. The end of device 100 that holds optical emitter 44 and optical detector 42 is placed against or near surface 70. As device 100 is moved relative to the surface 70, the pattern of markings is read and recorded by optical emitter 44 and optical detector 42. As discussed in more detail further below, in one embodiment, the markings on surface 70 are used to determine the position of device 100 relative to surface 70 (see FIGS. 3 and 4). Device 100 is placed at a position on surface 70. The pattern of markings at that position is read and translated into position information that is unique to that position. The position information is indexed to instructions, commands or the like that are programmed into device 100. Thus, by placing device 100 at a particular position on surface 70, and performing some type of actuating movement with device 100, a specific instruction or command associated with that position is executed by device 100.

Device 100 of FIG. 1 also includes a memory unit 48 coupled to the processor 32. In one embodiment, memory unit 48 is a removable memory unit embodied as a memory cartridge or a memory card. In another embodiment, memory unit 48 includes random access (volatile) memory (RAM) and read-only (non-volatile) memory (ROM) for storing information and instructions for processor 32.

In the embodiment of FIG. 1, device 100 includes a writing element 52 situated at the same end of device 100 as the optical detector 42 and the optical emitter 44. Writing element 52 can be, for example, a pen, pencil, marker or the like, and may or may not be retractable. In certain applications, writing element 52 is not needed. In other applications, a user can use writing element 52 to make marks on surface 70, including characters such as letters, numbers, symbols and the like. These user-produced marks can be scanned (imaged) and interpreted by device 100 according to their position on the surface 70. The position of the user-produced marks can be determined using a pattern of markings that are printed on surface 70; refer to the discussion of FIGS. 3 and 4, below. In one embodiment, the user-produced marks can be interpreted by device 100 using optical character recognition (OCR) techniques that recognize handwritten characters.

Surface 70 of FIG. 1 may be a sheet of paper, although surfaces consisting of materials other than paper may be used. Surface 70 may be a flat panel display screen (e.g., an LCD) or electronic paper (e.g., reconfigurable paper that utilizes electronic ink). Also, surface 70 may or may not be flat. For example, surface 70 may be embodied as the surface of a globe. Furthermore, surface 70 may be smaller or larger than a conventional (e.g., 8.5×11 inch) page of paper. In general, surface 70 can be any type of surface upon which markings (e.g., letters, numbers, symbols, etc.) can be printed or otherwise deposited. Alternatively, surface 70 can be a type of surface wherein a characteristic of the surface changes in response to action on the surface by device 100.

Figure 2:
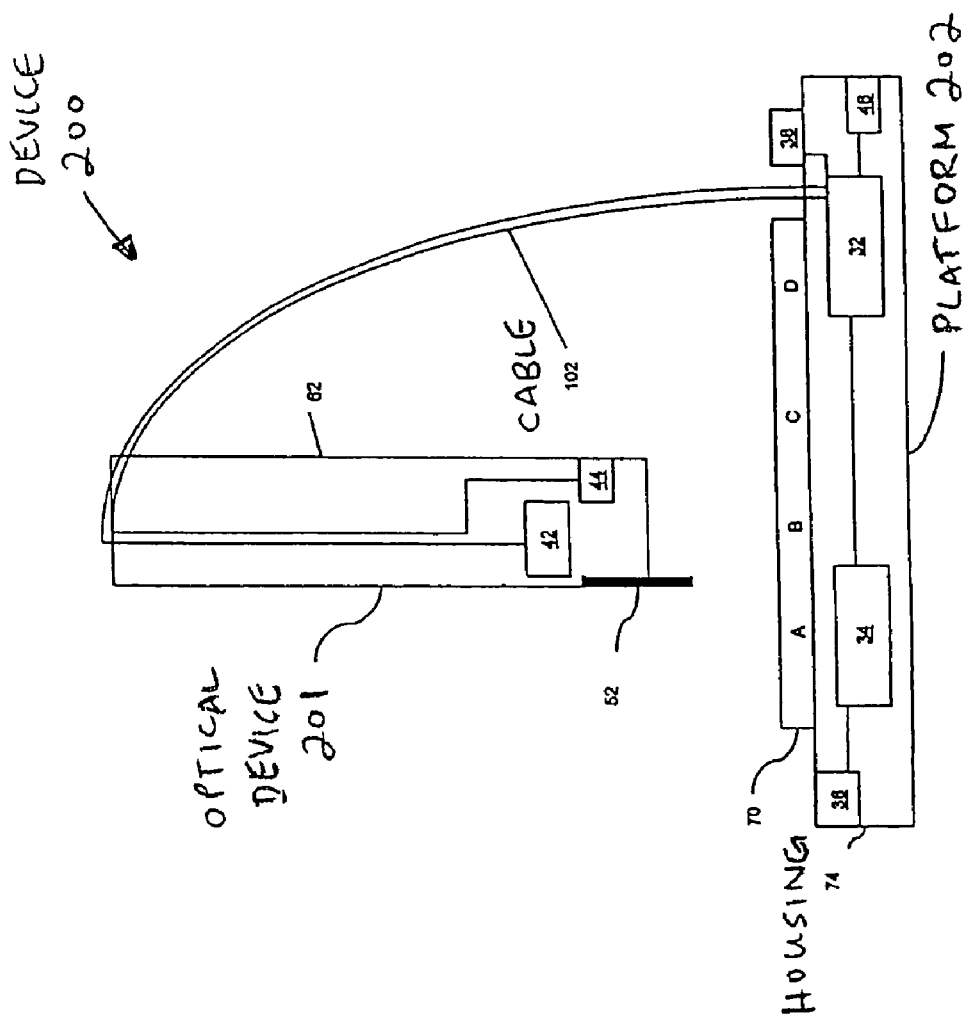
FIG. 2 is a block diagram of another device upon which embodiments of the present invention can be implemented.

FIG. 2 is a block diagram of another device 200 upon which embodiments of the present invention can be implemented. Device 200 includes processor 32, power source 34, audio output device 36, input buttons 38, memory unit 48, optical detector 42, optical emitter 44 and writing element 52, previously described herein. However, in the embodiment of FIG. 2, optical detector 42, optical emitter 44 and writing element 52 are embodied as optical device 201 in housing 62, and processor 32, power source 34, audio output device 36, input buttons 38 and memory unit 48 are embodied as platform 202 in housing 74. In the present embodiment, optical device 201 is coupled to platform 202 by a cable 102; however, a wireless connection can be used instead. The elements illustrated by FIG. 2 can be distributed between optical device 201 and platform 200 in combinations other than those described above.

Figure 3:
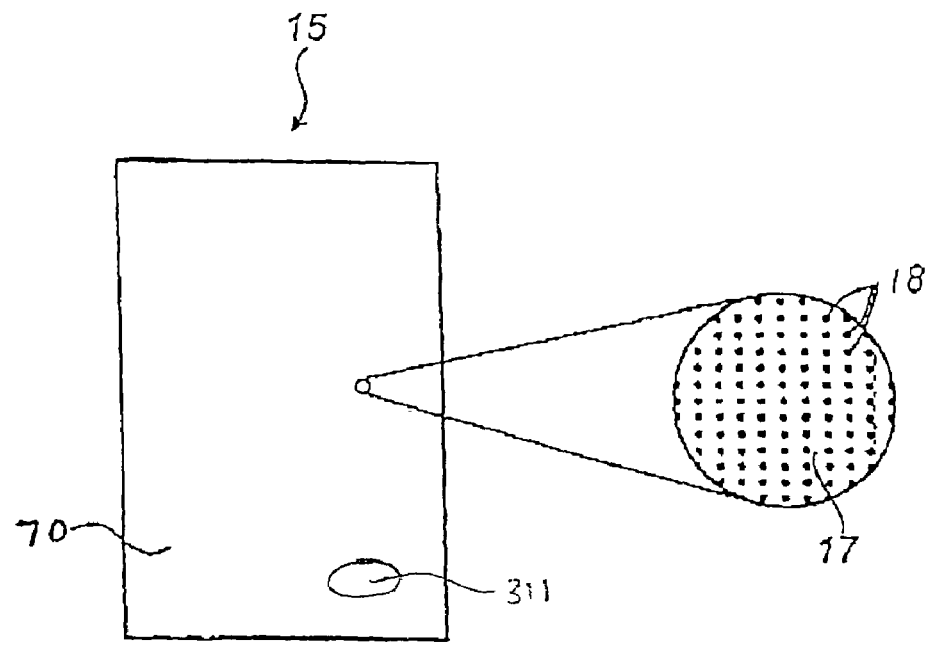
FIG. 3 shows an exemplary sheet of paper provided with a pattern of markings according to one embodiment of the present invention.

FIG. 3 shows a sheet of paper 15 provided with a pattern of markings according to one embodiment of the present invention. In the embodiment of FIG. 3, sheet of paper 15 is provided with a coding pattern in the form of optically readable position code 17 that consists of a pattern of marks 18. The marks 18 in FIG. 3 are greatly enlarged for the sake of clarity. In actuality, the marks 18 may not be easily discernible by the human visual system, and may appear as grayscale on sheet of paper 15. In one embodiment, the marks 18 are embodied as dots; however, the present invention is not so limited.

Figure 4:
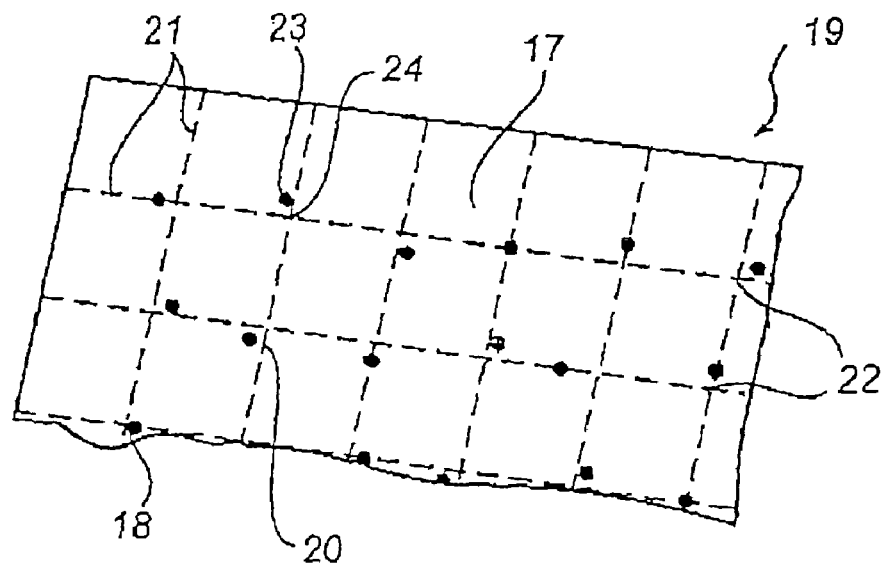
FIG. 4 shows an enlargement of a pattern of markings on an exemplary sheet of paper according to one embodiment of the present invention.

FIG. 4 shows an enlarged portion 19 of the position code 17 of FIG. 3. An optical device such as device 100 or 200 (FIGS. 1 and 2) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the surface 70. Thus, by matching the pattern in the image/raster with a pattern in the reference system, the position of the pattern on the surface 70, and hence the position of the optical device relative to the surface 70, can be determined. Additional information is provided by the following patents and patent applications, herein incorporated by reference in their entirety for all purposes: U.S. Pat. No. 6,502,756; U.S. patent application Ser. No. 10/179,966 filed on Jun. 26, 2002; WO 01/95559; WO 01/71473; WO 01/75723; WO 01/26032; WO 01/75780; WO 01/01670; WO 01/75773; WO 01/71475; WO 01/73983; and WO 01/16691. See also Patent Application No. 60/456,053 filed on Mar. 18, 2003, and patent application Ser. No. 10/803,803 filed on Mar. 17, 2004, both of which are incorporated by reference in their entirety for all purposes.

With reference back to FIG. 1, four positions or subsets of markings on surface 70 are indicated by the letters A, B, C and D (these characters are not printed on surface 70, but are used herein to indicate positions on surface 70). There may be many such subsets on the surface 70. Associated with each subset of markings on surface 70 is a unique pattern of marks. The subsets of markings on surface 70 may overlap because even if some marks are shared between overlapping regions, the pattern of marks in a subset is still unique to that subset.

In one embodiment, a user uses device 100 (specifically, using writing element 52) to create a character consisting of, for example, a circled letter "M" at position A on surface 70 (generally, the user may create the character at any position on surface 70). The user may create such a character in response to a prompt (e.g., an audible prompt) from device 100. When the user creates the character, device 100 records the pattern of markings that are uniquely present at the position where the character is created. The device 100 associates that pattern of markings with the character just created. When device 100 is subsequently positioned over the circled "M," device 100 recognizes the pattern of marks associated therewith and recognizes the position as being associated with a circled "M." In effect, in the present embodiment, device 100 recognizes the character using the pattern of markings at the position where the character is located, rather than by recognizing the character itself.

In another embodiment, a user uses device 100 (specifically, using writing element 52) to create a character consisting of, for example, a circled letter "M" at position A on surface 70 (generally, the user may create the character at any position on surface 70). As in the prior example, when the user creates the character, device 100 records the pattern of markings that are uniquely present at the position where the character is created (stroke data). Using a character recognition application, the stroke data can be read and translated into the character "M."

In one embodiment, a character is associated with a particular command. In the examples just described, a user can create (write) a character that identifies a particular command, and can invoke that command repeatedly by simply positioning device 100 over the written character. In other words, the user does not have to write the character for a command each time the command is to be invoked; instead, the user can write the character for a command one time and invoke the command repeatedly using the same written character.

In another embodiment, with reference to FIG. 3, sheet of paper 15 is preprinted with graphics at various locations on surface 70. In the example of FIG. 3, a graphic 311 of a button is shown. Graphic 311 lies over a pattern of markings that is unique to the position of graphic 311. By placing device 100 over the position of graphic 311, the pattern of dots underlying graphic 311 are read (scanned) and interpreted, and a command, instruction, function or the like associated with that pattern of dots is implemented by device 100. Some type of actuating movement may be performed using device 100 in order to indicate that device 100 has been placed over graphic 311 with the intention of invoking the function, etc., associated with graphic 311.

Figure 5:
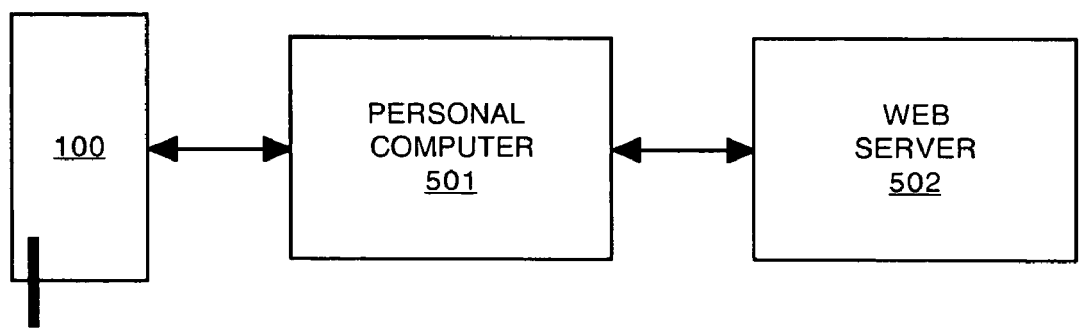
FIG. 5 is a block diagram showing one embodiment of a network of devices in accordance with the present invention.

FIG. 5 is a block diagram showing one embodiment of a network of devices in accordance with the present invention. In the example of FIG. 5, the device 100 is linked to a personal computer 501 (e.g., a desktop or laptop computer), which in turn is linked to a Web server 502. The links between the devices may be a wired link or a wireless link or a combination thereof. In an alternative arrangement, device 100 communicates directly to Web server 502, bypassing computer 501. As another alternative, computer 501 serves as the Web server.

Figure 6:
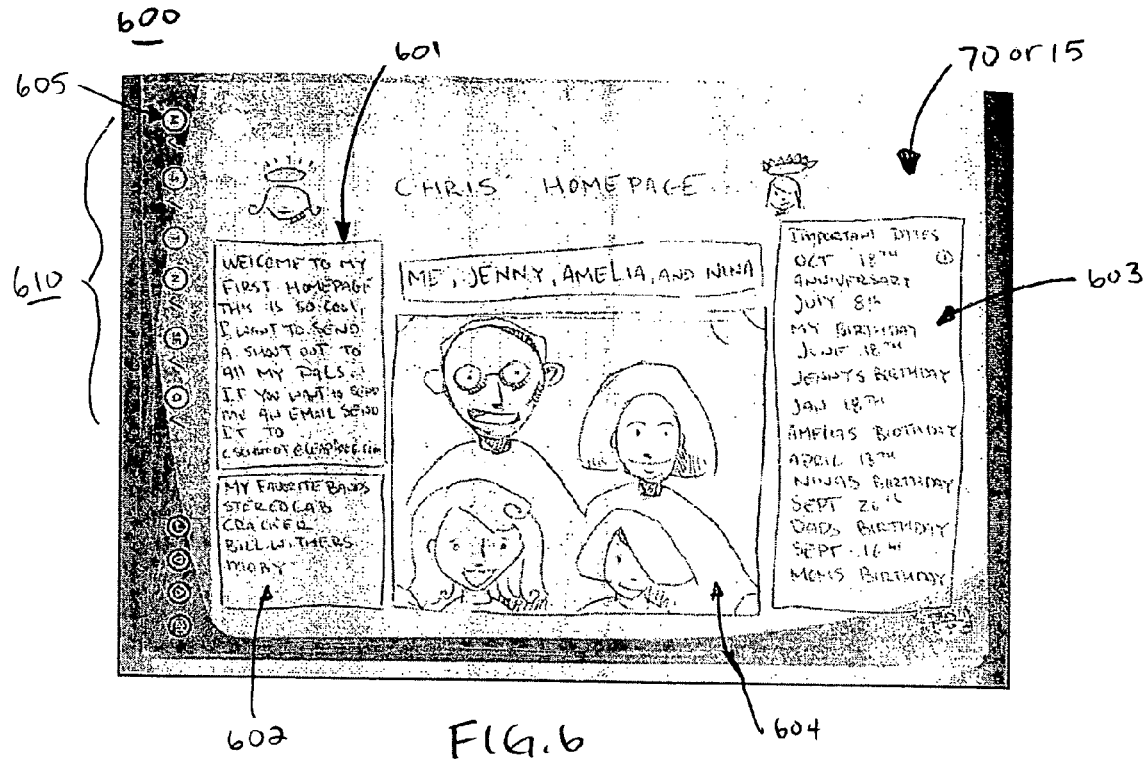
FIG. 6 is an example of a Web page design according to an embodiment of the present invention.

FIG. 6 is an example of a Web page design 600 according to an embodiment of the present invention. To design a Web page in accordance with embodiments of the present invention, a user uses an optical pen (e.g., device 100 of FIG. 1) to write or draw information on a surface 70, which may be a sheet of paper 15. As previously mentioned herein, the surface 70 includes a pattern of marks (e.g., a dot pattern) that can be translated (decoded) into position information.

According to embodiments of the invention, the user can make any type of mark on the surface 70. A mark may take any shape and may include multiple characters. That is, a mark can be a single mark, a letter or a number, a string of letters and/or numbers, a drawing, a part of a drawing, a line or lines (straight or otherwise), symbols, etc., without limitation. The device 100 captures each mark as it is made and stores it in memory unit 48 (FIG. 1) as stroke data. That is, as a mark is made, it will traverse some subset of the pattern of markings on surface 70. As the mark is made, device 100 records the position information associated with that subset of markings. Alternatively, device 100 records a portion of that subset sufficient for defining the mark. As a simple example, a straight line can be encoded and stored as a beginning set of coordinates and an ending set of coordinates, where the two sets of coordinates are determined by decoding the pattern of markings on surface 70.

The example of FIG. 6 shows a number of regions 601, 602, 603 and 604 that are created using the device 100. These regions may be defined by the user, or they may be defined in advance; this is discussed further in conjunction with FIGS. 8 and 9, below.

In one embodiment, a type of operation is associated with each of the regions 601-604. In such an embodiment, a mark made in the region is operated on according to the operation associated with that region. In general, if an operation is associated with a region (e.g., region 601), then that operation is applied to any mark made in that region (more specifically, to the stroke data corresponding to a mark made in that region). However, as will be seen, a sub-region can be identified within a region such as region 601. Marks made within a sub-region may not be operated on in the same way as other marks within the region.

In one embodiment, the operation is a process that is applied to the stroke data. For example, a character recognition process can be applied to the stroke data. The type of process may be selected by the user, or it may be automatically selected according to the position of the region—or equivalently, the position of the mark—on the surface 70. Different operations may be associated with each of the regions 601-604.

In another embodiment, a type of metadata is associated with each of the regions 601-604, and hence with marks within the regions. The type of metadata may be selected by the user, or it may be automatically selected according to the position of the region—or equivalently, the position of the mark—on the surface 70.

Region 601 of FIG. 6 may be defined, for example, as a text box, either automatically or by the user, and so any content (any mark) in region 601 is associated with metadata identifying that content as text. The metadata can also include information that specifies a format for the text. For example, the metadata can include information that specifies a font size, a color, or other aspects of the appearance of the text.

Different types of metadata may be associated with each of the regions 601-604. In addition to the example above, the metadata can be used to associate various properties or levels of functionality with the content in each of the regions 601-604. For example, text that is printed on the surface 70 can be linked to sounds (e.g., audio or music samples) stored on the device 100. In the example of FIG. 6, region 602 includes a list of a number of musical groups. According to embodiments of the present invention, and as described more fully in conjunction with FIG. 9 below, each of the items in the list can be individually selected such that, for example, a different sound can be associated with each item.

An audio file can be associated with text printed on surface 70 using one or more of the menu graphics (e.g., icons) 610, exemplified by graphic 605. Graphic 605 is printed over a particular subset of the pattern of markings, such that the pattern is visible through graphic 605. By placing the device 100 over graphic 605, the pattern of markings underlying the graphic can be sensed. In response to the decoding of the pattern underlying graphic 605, a command or set of instructions associated with that pattern is automatically invoked. Thus, for example, to associate a particular audio file with the "STEREOLAB" entry in region 602, the device 100 is positioned over the appropriate graphic 610 to invoke the command used to associate metadata with an item printed/drawn on surface 70. The device 100 may then be positioned over a second graphic 610 to invoke a menu that allows the STEREOLAB audio file to be accessed. For example, the second graphic 610 is repeatedly invoked until the user hears "STEREOLAB." Once "STEREOLAB" is verbalized by device 100, the device 100 is positioned over the "STEREOLAB" entry printed on surface 70, to make the association between the audio file and that entry. In this manner, metadata associating a file to an entry on surface 70 is attached to that entry.

In the example of FIG. 6, region 603 includes a list of dates. In one embodiment, using an approach similar to that just described, the metadata can be used to link these dates with a calendar application on device 100, so that these dates can be loaded into that application, or vice versa.

In the example of FIG. 6, region 604 includes a hand-drawn illustration that can be included in the Web page. Alternatively, a photograph (e.g., a Joint Photographic Experts Group file) or some other type of media content can be imported.

Embodiments of the present invention are not limited to the types of metadata described in the examples above. For example, by invoking the appropriate command in a manner similar to that described above, a hyperlink to another Web site can be associated with an entry on the surface 70. Furthermore, an animated GIF (Graphic Interchange Format) file can be associated with an entry on surface 70 to incorporate animation into the Web page when it is displayed.

Furthermore, in one embodiment, metadata is associated with processed stroke data, thus essentially associating two levels of information with the stroke data. That is, for example, the stroke data may be processed using a character recognition process to identify a character or string of characters, and metadata may then be associated with the character or character string.

In general, according to embodiments of the present invention, the device 100 of FIG. 1 provides the following capabilities:

1. the capability to capture stroke data;
2. the capability to identify a region associated with the captured stroke data and to apply a process (e.g., a character recognition process) to the stroke data; and
3. the capability to identify a region associated with the captured stroke data and to apply metadata to the stroke data, or to processed stroke data. In the latter case, for example, a character recognition process can be applied to the stroke data, and then metadata can be applied to a string of such characters (e.g., letters and/or numbers), identifying them as a hyperlink, an email address, etc.

Figure 7:
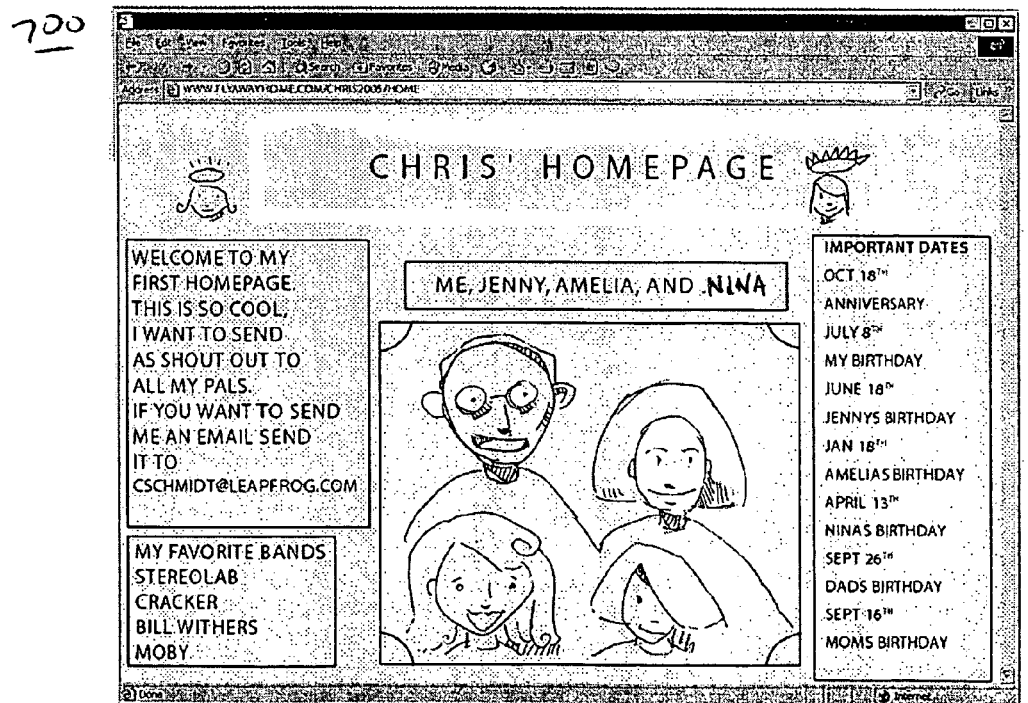
FIG. 7 is an example of a displayed Web page based on the Web page design of FIG. 6 according to an embodiment of the present invention.

FIG. 7 is an example of a displayed Web page 700 based on the Web page design 600 of FIG. 6 according to an embodiment of the present invention. In one embodiment, the Web page design 600—specifically, the stroke data and the associated metadata—is stored on device 100 (FIG. 1) until the device is linked (synchronized) with personal computer 501 or Web server 502. The stroke data may have been processed using, for example, a character recognition process. Once the link is made, the Web page design information can be used by an HTML editor, or a similar type of software application, to produce displayed Web page 700.

Furthermore, content that may reside on the computer 501 can also be synchronized with the Web page design information received from device 100. For example, a user may intend to import a JPEG file resident on the computer 501 into the displayed Web page 700. While designing the Web page as described, a user may invoke a command that associates a file name with an entry on surface 70. In response to a verbal prompt, the user can write the file name (including directories and subdirectories) on surface 70. The file name is associated with the entry on surface 70 as metadata, in a manner similar to that described in the examples above. When the device 100 is linked to computer 501, the file can be incorporated into the displayed Web page 700.

Thus, according to embodiments of the present invention, a user can author Web content using device 100 in conjunction with a suitable surface 70, then connect the device 100 to the Internet (either directly or via another computer) to upload that content to a Web server. As such, device 100 serves as the primary tool for Web content creation.

Figure 8:
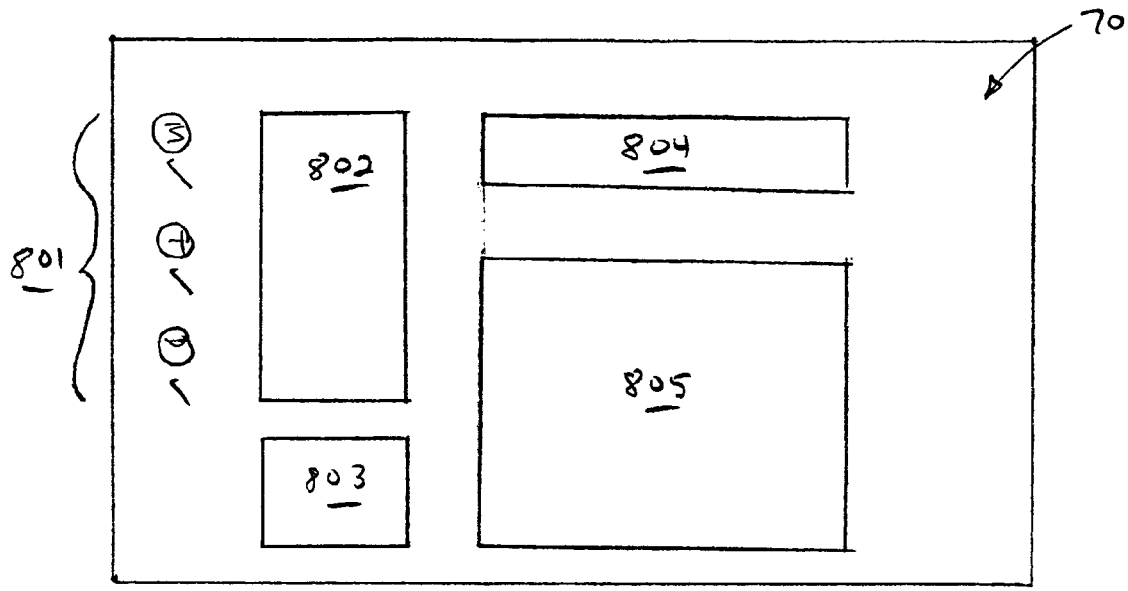
FIG. 8 is an example of a user interface for Web page design according to an embodiment of the present invention.

FIG. 8 is an example of a user interface for Web page design according to an embodiment of the present invention. In the example of FIG. 8, the user interface includes a surface 70 having printed thereon a number of predefined graphics 801 (e.g., icons) as well as a number of predefined regions 802, 803, 804 and 805. Within the regions defined by elements 801-805 are respective patterns of markings, such as the patterns of markings described above in conjunction with FIGS. 3 and 4. In one embodiment, surface 70 constitutes a preprinted sheet of digital paper on which the elements 801-805 have been printed.

In the embodiment of FIG. 8, the graphics 801 are used to invoke commands in a manner such as that described in the examples above. The graphics 801 do not necessarily have to appear on the same piece of paper used to design a Web page. For example, the graphics 801 can appear in a users' manual or on a reference card.

In one embodiment, a particular type of operation is automatically associated with content (e.g., marks) entered into the regions 802-805 and sensed by device 100 (FIG. 1). Different types of operations may be associated with each of the regions 802-805. For example, a character recognition process may be associated with region 802, and that process is then automatically applied to each mark made within that region.

In another embodiment, a particular type of metadata is automatically associated with content entered into the regions 802-805. Different types of metadata may be associated with each of the regions 802-805. For example, content entered into region 802 may be automatically identified as text, and metadata indicating this property is automatically associated with each mark made within that region.

As mentioned above, a mark made within a region may be processed according to an operation associated with the region, and then metadata may be applied to the processed data.

A user may assign a type of processing and/or metadata to a region. Thus, for example, although the boundaries of region 802 are established, a type of processing and/or metadata may not be assigned to region 802 until the user makes a selection. In one embodiment, the user can make a selection by placing device 100 (FIG. 1) over the region 802, and then over one of the graphics 801.

Figure 9:
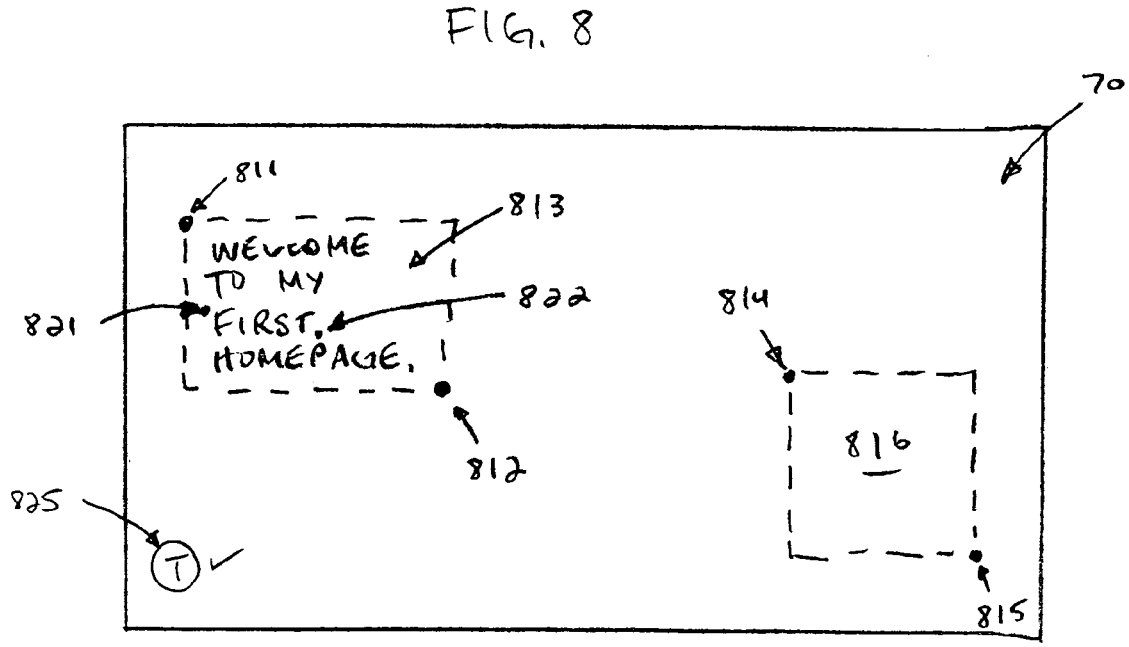
FIG. 9 is another example of a user interface for Web page design according to an embodiment of the present invention.

FIG. 9 is another example of a user interface for Web page design according to an embodiment of the present invention. In the example of FIG. 9, the user interface is initially a blank sheet of paper, except for the pattern of markings described previously herein. In one embodiment, the user defines a region 813 by placing the device 100 (FIG. 1) over the position labeled 811 and then over the position labeled 812, or vice versa. The content within the region 813 may be present before the region is defined, or the content may be added after region 813 is defined. That is, in the former instance, the user may write or draw content on the surface 70, and then subsequently define a region 813 encompassing the content. The latter instance is illustrated as region 816, which is defined by placing the device 100 over the points labeled 814 and 815. Depending on the user's preferences, the boundaries of the regions 813 and 816 may be visible or invisible.

Also illustrated in FIG. 9 is an example of a region (a sub-region) that is defined within region 813. In the example of FIG. 9, the word "first" is selected by placing the device 100 over the points labeled 821 and 822. Accordingly, a type of processing and/or metadata may be associated with the word "first" that is different from the type of processing and/or metadata associated with the other content in region 813. For example, the word "first" may be underlined, or it may be rendered using a color or font different than that of the surrounding text.

Also, by creating a sub-region within a region, editing functions can be performed. For example, the word "first" can be deleted or otherwise edited separately from the remainder of the content in region 813. Editing functions can also be implemented by replacing the entire content of a region.

A user may assign a type of processing and/or metadata to a region such as region 813. In one embodiment, the user can make a selection by placing device 100 (FIG. 1) over the region 813, and then over the graphic 825.

In one embodiment, graphic 825 is also created by the user with device 100 (FIG. 1), as previously described herein. Graphic 825 is used to invoke a command, in a manner similar to that described previously herein. For example, the graphic 825 can be used to associate a particular type of processing and/or metadata with a region defined by the user. Just as a region can be defined before or after content is written or drawn by the user on surface 70, so can a particular type of processing and/or metadata be associated with the region before or after the content is written or drawn.

A combination of the interfaces of FIGS. 8 and 9 may be used to design a Web page. For example, there may be predefined regions printed on the surface 70 as in FIG. 8, and the user may define additional regions as in FIG. 9.

Figure 10:
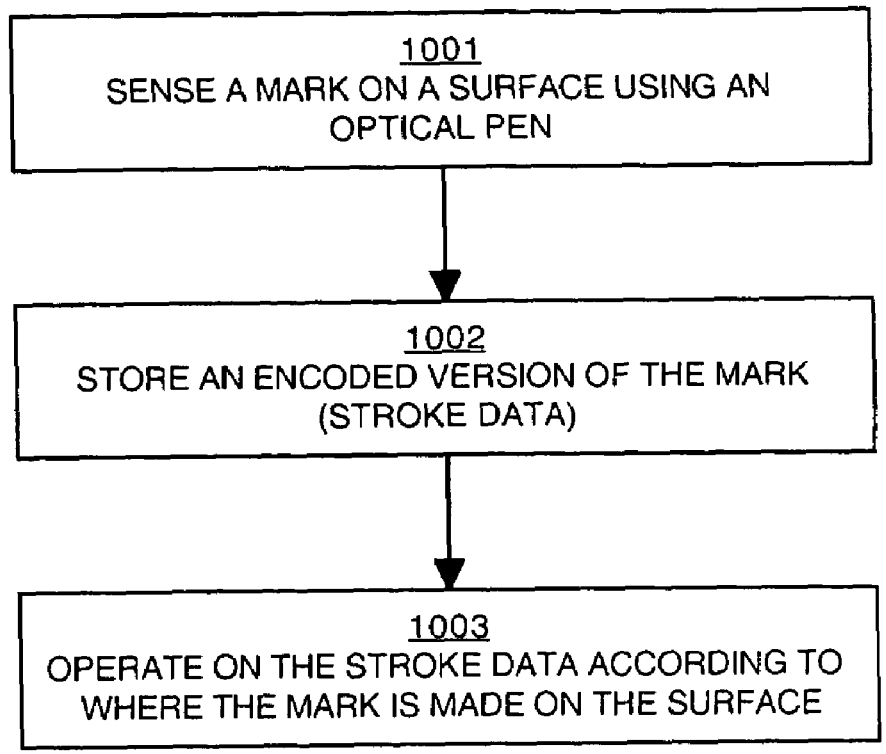
FIG. 10 is a flowchart of a computer-implemented method for storing information according to one embodiment of the present invention.

FIG. 10 is a flowchart 1000 of a computer-implemented method for storing information according to one embodiment of the present invention. In the present embodiment, with reference also to FIG. 1, flowchart 1000 can be implemented by device 100 as computer-readable program instructions stored in memory unit 48 and executed by processor 32. Although specific steps are disclosed in FIG. 10, such steps are exemplary. That is, the present invention is well suited to performing various other steps or variations of the steps recited in FIG. 10.

In one embodiment, in step 1001 of FIG. 10, with reference also to FIGS. 1 and 3, a mark on a surface 70 (e.g., on a piece of paper 15) is sensed by a device 100 as the mark is made on the surface by a writing element 52. As discussed above, the surface 70 has printed thereon a pattern of markings (e.g., a dot pattern) that defines spatial (e.g., two-dimensional) coordinates on the surface (see FIGS. 3 and 4).

In step 1002 of FIG. 10, an encoded version of the mark (e.g., stroke data) is stored in memory unit 48 (FIG. 1).

In step 1003 of FIG. 10, the stroke data is associated with a particular region on the surface 70, and associated with that region is a particular operation. As a result, that operation is automatically performed on the stroke data.

In one embodiment, the operation includes processing of the stroke data using, for example, a character recognition application.

In another embodiment, metadata is associated with the encoded version of the mark. The metadata is subsequently used when a representation of the mark is rendered as, for example, a Web page. That is, a representation of the mark, when rendered on a display device, will have a property that is determined according to the metadata.

In one embodiment, inputs that identify what type of operation to associate with a region are received by device 100 (FIG. 1). To generate the inputs, the device 100 senses both the subset of the pattern of markings on the surface 70 (FIG. 1) associated with the region and a subset of the pattern of markings associated with a type of operation. For example, with reference to FIG. 9, device 100 senses the pattern of markings in region 813, and device 100 also senses the pattern of markings underlying graphic 825. In essence, decoding the pattern of markings underlying graphic 825 invokes a command that associates a type of operation with the region 813.

In another embodiment, with reference to FIG. 8 for example, the surface 70 has printed thereon a pre-designated region (e.g., region 802) encompassing a portion of the pattern of markings. A type of operation is associated with the designated region. As a result, that type of operation is associated automatically with any mark made in the region. In yet another embodiment, with reference to FIG. 9 for example, a user can create such a region (e.g., region 813).

In summary, according to embodiments of the present invention, using a device such as device 100 (FIG. 1) as the primary design tool, a user can design, for example, a Web page (e.g., a home page) by drawing the Web page on, for example, a piece of paper on which is printed a pattern of markings (e.g., a dot pattern) that defines spatial coordinates on the paper. In one embodiment, as part of the process of drawing the page, the various portions of the drawing are operated on according to their respective locations on the piece of paper, either automatically or at the behest of the user. Different types of operations can be associated with different parts of the drawing, indicating what parts of the drawing are text or images, attaching hyperlinks or sounds, adding animation, and the like. The drawing information is stored in the optical pen until the pen is connected to a personal computer or a Web server in order to create a Web site. As a result, Web page design is made more convenient and more intuitive.

Embodiments of the present invention are thus described. While the present invention has been described in particular embodiments, it should be appreciated that the present invention should not be construed as limited by such embodiments, but rather construed according to the below claims.

What is claimed is:

1. A method of storing information captured by an optical pen, said method comprising:
   sensing a mark on a surface, said sensing performed by an optical sensor coupled to said optical pen as said mark is made on said surface by a writing utensil associated with said optical pen, said surface comprising a pattern of markings that define spatial coordinates on said surface;
   storing stroke data associated with said mark, wherein said stroke data comprises coordinates corresponding to a subset of said pattern of markings traversed by said mark; and
   associating said stroke data with a region of said surface, wherein said stroke data is operated on according to an operation associated with said region, wherein said operation comprises associating metadata with said stroke data, wherein a representation of said mark that is rendered on a display device has a property that is selected according to said metadata.

2. The method of claim 1 wherein said metadata is used by a software application to create a Web page comprising said representation of said mark when displayed.

3. The method of claim 1 wherein said metadata comprises information identifying a computer file.

4. The method of claim 1 wherein said metadata comprises information identifying a Web site.

5. The method of claim 1 wherein said metadata comprises information identifying a format for rendering said representation of said mark.

6. The method of claim 1 further comprising receiving inputs that identify a type of operation to associate with said region, wherein said inputs are generated by said optical pen sensing a first subset of said pattern of markings on said surface associated with said region and also sensing a second subset of said pattern of markings associated with said type of operation.

7. The method of claim 1 further comprising decoding a portion of said pattern of markings, wherein said decoding of said portion invokes a command that associates said operation with said region.

8. The method of claim 1 wherein said surface wherein said region is a pre-designated region encompassing a portion of said pattern of markings, wherein said operation is automatically performed on stroke data associated with said region.

9. The method of claim 1 further comprising:
   decoding portions of said pattern of markings to identify a set of coordinates; and
   defining said region using said set of coordinates, wherein said operation is automatically performed on stroke data associated with said region.

10. The method of claim 1 wherein said operation comprises character recognition.

11. A pen-shaped device comprising:
a writing element projecting from a housing;
an optical detector coupled to said housing;
a processor coupled to said optical sensor; and
a memory coupled to said processor, said memory unit containing instructions that when executed implement a method for storing information accessed on a surface having printed thereon a pattern of markings that define spatial coordinates, said method comprising:
sensing a mark on a surface, said sensing performed using said optical detector as said mark is made on said surface by a writing element;
storing stroke data associated with said mark, wherein said stroke data comprises coordinates corresponding to a subset of said pattern of markings traversed by said mark; and
associating said stroke data with a region of said surface, wherein said stroke data is operated on according to an operation associated with said region, wherein said operation comprises associating metadata with said stroke data, wherein a representation of said mark that is rendered on a display device has a property that is selected according to said metadata.

12. The device of claim 11 wherein said metadata is used by a software application to create a Web page comprising said representation of said mark when displayed.

13. The device of claim 11 wherein said method further comprises receiving inputs that identify a type of operation to associate with said region, wherein said inputs are generated by said optical pen sensing a first subset of said pattern of markings on said surface associated with said region and also sensing a second subset of said pattern of markings associated with said type of operation.

14. The device of claim 11 wherein said method further comprises decoding a portion of said pattern of markings, wherein said decoding of said portion invokes a command that associates said operation with said region.

15. The device of claim 11 wherein said surface wherein said region is a pre-designated region encompassing a portion of said pattern of markings, wherein said operation is automatically performed on stroke data associated with said region.

16. The device of claim 11 wherein said method further comprises:
decoding portions of said pattern of markings to identify a set of coordinates; and
defining said region using said set of coordinates, wherein said operation is automatically performed on stroke data associated with said region.

17. A computer-usable medium having computer-readable program code embodied therein for causing a pen-shaped computer system to perform a method of retrieving and storing information from a surface, said method comprising:
sensing a mark on said surface, said sensing performed using an optical sensor coupled to said computer system as said mark is made on said surface by a writing utensil moving in tandem with said optical sensor, said surface comprising a pattern of markings that define spatial coordinates on said surface;
storing stroke data associated with said mark, wherein said stroke data comprises coordinates corresponding to a subset of said pattern of markings traversed by said mark; and
associating said stroke data with a region of said surface, wherein said stroke data is operated on according to an operation associated with said region, wherein said operation comprises associating metadata with said stroke data, wherein a representation of said mark that is rendered on a display device has a property that is selected according to said metadata.

18. The computer-usable medium of claim 17 wherein said metadata is used by a software application to create a Web page comprising said representation of said mark when displayed.

19. The computer-usable medium of claim 17 wherein said method further comprises receiving inputs that identify a type of operation to associate with said region, wherein said inputs are generated by said optical pen sensing a first subset of said pattern of markings on said surface associated with said region and also sensing a second subset of said pattern of markings associated with said type of operation.

20. The computer-usable medium of claim 17 wherein said method further comprises decoding a portion of said pattern of markings, wherein said decoding of said portion invokes a command that associates said operation with said region.

21. The computer-usable medium of claim 17 wherein said surface wherein said region is a pre-designated region encompassing a portion of said pattern of markings, wherein said operation is automatically performed on stroke data associated with said region.

22. The computer-usable medium of claim 17 wherein said method further comprises:
decoding portions of said pattern of markings to identify a set of coordinates; and
defining said region using said set of coordinates, wherein said operation is automatically performed on stroke data associated with said region.

* * * * *